United States Patent [19]

Rebaudieres et al.

[11] 4,342,787

[45] Aug. 3, 1982

[54] DESSERT PREPARATION

[75] Inventors: Paul Rebaudieres, Rueil Malmaison; Jean-Michel Azzi, Paris, both of France

[73] Assignee: General Foods France S.A., Rueil Malmaison, France

[21] Appl. No.: 110,271

[22] Filed: Jan. 7, 1980

[51] Int. Cl.$^3$ ............................................. A23L 1/195
[52] U.S. Cl. ...................................... 426/103; 426/578; 426/579; 426/660
[58] Field of Search .................... 426/94, 92, 96, 578, 426/579, 103, 632, 660

[56] References Cited

U.S. PATENT DOCUMENTS

| | | | |
|---|---|---|---|
| 2,788,277 | 4/1957 | Huber | 426/96 |
| 2,851,365 | 9/1958 | Perrozzi | 426/96 |
| 3,911,155 | 10/1975 | Ferrero | 426/94 |
| 3,976,793 | 8/1976 | Olson | 426/96 |
| 4,112,125 | 9/1978 | Chesnut | 426/578 |
| 4,192,900 | 3/1980 | Cheng | 426/578 |

Primary Examiner—Jeanette M. Hunter
Attorney, Agent, or Firm—Thomas V. Sullivan; Bruno P. Struzzi; Daniel J. Donovan

[57] ABSTRACT

A dessert preparation which comprises a dessert base powder and a food material such as pieces of a starch-based material, which food material has a texture different to that of the dessert base powder and has thereon a coating which renders the food material substantially nonabsorptive of moisture. The preferred coating is chocolate, particularly couverture chocolate.

The dessert preparation is suitable for making, using milk and/or water, a dessert product having contrasting textures which remain stable to the taste for a period of several hours.

7 Claims, No Drawings

DESSERT PREPARATION

DESCRIPTION

1. Technical Field

The present invention relates to a dessert preparation suitable for making, using milk and/or water, a dessert product having contrasting textures which remain stable to the taste for a period of several hours.

2. Background Art

There are many instant dessert products available in the marketplace tht are dry powder mixes, which when reconstituted with milk/water and allowed to stand for a period of time, provide a stiff or viscous pudding-type product, and are smooth and creamy to the taste.

Such products, however, are uniformly textured, since the composition of the made-up product is identical in all portions.

It would be desirable to be able to provide a similar product, but which has a nonuniform or contrasting texture, derived from the inclusion of other differently textured food materials in the original dry powder mix, or made-up mix. The kind of contrasting texture especially in mind is 'crispness', provided by processed starch-based pieces or other expanded food materials.

Prior art suggests that while such conventional starch-based pieces can be readily placed in the made-up product or included in the dry mix product, they will very quickly absorb moisture and become 'soggy' (or lose crispness) in the made-up product. Loss of crispness can occur after standing a few minutes to give an unattractive tasting product.

We have now found that precoating the food material, for example starch pieces, with a coating of a material which will render the food material sufficiently nonabsorptive of moisture in the instant dessert product, even on make-up with milk or water, a textured product which retains its contrasting texture for a considerable period of time, several hours, and which is a considerable convenience to the user and consumer, may be obtained.

DISCLOSURE OF THE INVENTION

According to the present invention, there is provided a dessert preparation which comprises a dessert base powder and a food material, which food material has a texture different to that of said dessert base powder and has thereon a coating which renders said food material substantially nonabsorptive of moisture.

The invention also provides a dessert product which has a nonuniform texture and which contains a food material having thereon a coating which renders said food material substantially nonabsorptive of moisture.

Suitable coating materials include liquified chocolate, liquid high-fat toffee mixtures, and confectioner's varnish. By confectioner's varnish is meant a composition not only containing sugar and food gums, but also waxy materials like edible shellac. The coating materials may be applied to the processed starch pieces, or pieces of other foodstuff material which provide a contrasting texture to the otherwise homogeneous basic dessert mix, by a pan-coating process, either by manual addition or by spraying, or by enrobing methods. It is necessary to ensure that all the surface pores are covered and a sufficiently thick coating is applied. A coating having a thickness of from 0.5–1.0 mm has been found to be suitable. A pre-coating by a sugar glaze is desirable but not essential to provide a suitable surface for a chocolate coating. The type of chocolate most suitable for coating use is that known as couverture chocolate. A final finishing sugar glaze containing food gums may also be applied. However, since neither of these additional sugar-based coatings will contribute substantially to the water-proofing qualities, the chocolate layer should still have a thickness of from 0.5–1.0 mm.

The processed starch pieces can be of a number of conventional and commercial types, that is, those based on expanded or extruded cereals, such as rice, wheat or corn. The dessert base powder may be any dessert base power which gives smooth homogeneous pudding-type textures on the addition of milk. Conventional dessert base powders comprise essentially pre-gelatinized starch and milk-gelling agents. The invention is not limited to starch-like pieces, but may be of other carbohydrate materials susceptible to loss of texture character on moisture pickup. Expanded nuts are a further example of this type. Freeze-dried fruits or air-dried fruits, such as apple flakes, are yet further examples. The coated pieces may be either mixed with the dessert base powder and packaged together or the coated pieces and dessert base powder may be placed in separate packages within an outer package so that the consumer may add the coated piece himself to the separate dessert powder after make-up with milk.

BEST MODE FOR CARRYING OUT THE INVENTION

The present invention is further illustrated by the following Examples.

EXAMPLE I

A caramelized sugar syrup was prepared by heating sugar with about 17% water at a temperature of 117° C. A crisp puffed rice cereal was immersed in the sugar syrup with stirring. The coated rice cereal was removed and cooled.

After cooling, the sugar-coated rice cereal was placed in a pan coater and uniformly coated with twice its weight of a couverture chocolate (containing cocoa paste, added cocoa butter, and sugar, including 0.5% lecithin, and in which the total cocoa butter content was 32.5%). About half of the melted chocolate at a temperature of about 38°–39° C. was gradually added to the tumbling rice to achieve maximum coating. Cool dry air was blow onto the coated rice. This procedure was repeated to apply a second coat of chocolate. The thickness of this final layer was about 0.5 mm, and the procedure took 3–4 hours.

The coated rice cereal was then blended to the extent of 1/20th to 1/5th the weight of blended product with an instant pudding base powder having a formulation conforming to within the range of the following ingredient levels by weight:

Sugar: 42–51%
Starch: 9.9–14.5%
Phosphates: 2.0–2.2%
Vegetable fat: 12.5–17.2%
Emulsifier: 2.3–3.4%
Flavor: 0.1–1.0%

EXAMPLE II

The uniform blend of pudding base powder and coated rice cereal of Example I was further blended with milk to disperse the powder and evenly disperse the coated rice cereal throughout the mixture. The mixture was then permitted to sit for approximately 10 minutes, after which it was ready for consumption.

Organoleptic evaluation of the reconstituted product showed the rice cereal particles to remain crisp for as long as four hours or more after preparation.

We claim:

1. A dessert preparation which comprises a mixture of an instant pudding powder with about 80–95% by weight of the preparation of a food material selected from the group consisting of expanded starch based cereals such as rice, wheat, and corn; freeze-dried and air-dried fruits, and expanded nuts; said food material having a texture different from that of the instant pudding powder and having thereon a coating selected from the group of coatings consisting of chocolate, high-fat toffee mixture and confectioner's varnish; said coating rendering the coated food material substantially nonabsorptive of moisture.

2. A preparation as claimed in claim 1, in which said coating has a thickness of from 0.5 to 1.0 mm.

3. A preparation as claimed in claim 1, in which said coating comprises a first layer adjacent said food material of a sugar glaze, a second layer of chocolate, and a third layer of a finishing sugar glaze.

4. A preparation as claimed in claim 3, in which the second layer has a thickness of from 0.5 to 1.0 mm.

5. A preparation as claimed in claim 1, in which said coating has been applied to said food material by a pan-coating or enrobing technique.

6. A preparation as claimed in claim 1, in which said dessert base powder and said food material are in separate packages within an outer package.

7. A dessert product prepared from the dessert preparation of claim 1.

* * * * *